Figure 1:
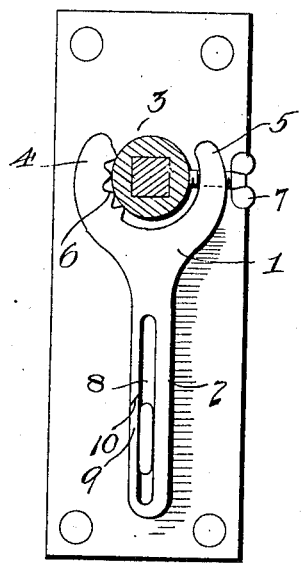
Figure 2:
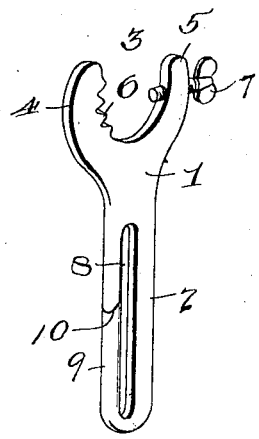

UNITED STATES PATENT OFFICE.

EMIL RUEFF, OF NEW YORK, N. Y.

MAGNESIUM CEMENT AND PROCESS OF MAKING THE SAME.

No. 872,375.  Specification of Letters Patent.  Patented Dec. 3, 1907.

Application filed April 19, 1907. Serial No. 369,041.

*To all whom it may concern:*

Be it known that I, EMIL RUEFF, a citizen of the United States, and a resident of the borough of Manhattan, city, county, and State of New York, have invented certain new and useful Improvements in Magnesium Cement and Processes of Manufacturing the Same, of which the following is a specification.

The object of my invention is to produce an improved magnesia cement which is non-hygroscopic and can therefore resist atmospheric influences, and which, when mixed with water, will form a dense stone-like mass capable of use in positions exposed to the influence of moisture.

My cement is obtained by mixing powdered magnesia with powdered magnesium sulfate in amorphous condition.

I am aware of the fact that cement has already been made by mixing magnesia and commercial magnesium sulfate, the latter being the crystalline substance known in the trade as Epsom salt. (See U. S. patent to Jeroch, No. 833,930, October 23, 1906, for magnesium cement.) This crystalline magnesium sulfate cannot be ground to a fine amorphous powder. It is too readily soluble in water, and, when mixed with magnesia and water, recrystallizes quickly and does not combine in sufficient quantity chemically with the magnesia, but causes the resultant stone to be brittle and easily disintegrated when placed under water.

I destroy the crystalline character of the magnesium sulfate in the manner hereinafter described and produce an amorphous mass which can readily be powdered to any desired degree of fineness. When the amorphous powder obtained by grinding this mass is mixed with calcined magnesite, and water is added to the resultant mixture, a chemical reaction takes place as indicated by the heat developed, and a product results which may be called a basic sulfate of magnesia. This product is a dense mass which has strong cementing qualities.

My cement is manufactured in the following manner: I heat, slowly, Epsom salt ($MgSO_4 7H_2O$), keeping it at a temperature of about 140° C. until water of crystallization has been driven off to the amount of from 35 to 40 per cent. of the original weight of the Epsom salt. The resulting substance, dehydrated magnesium sulfate, (substantially $MgSO_4 H_2O$) is an amorphous flaky mass. This is ground to a fine powder and mixed with powdered magnesia. This magnesia may be obtained from magnesite by calcination or from dolomite heated to a point at which only the carbonic acid in combination with magnesia is driven out.

I have found that I may use in place of the epsom salt finely powdered kieserite, which mineral contains a large percentage of substantially pure magnesium sulfate in amorphous condition, (substantially $MgSO_4 H_2O$). I may, of course, dehydrate the Epsom salt in the usual manner by quick heating, but in that case the substance first fuses in its own water of crystallization, and, when such water is driven off, a hard mass remains which must be subjected to a great deal of grinding before it assumes the divided form which results from my improved method of slow dehydration described above. I prefer to mix the two ingredients in substantially the proportions of 135 parts by weight of powdered magnesium sulfate in amorphous condition to 200 parts by weight of magnesia.

The dry cement, in powder form, is packed in barrels and is then ready for shipment. It is non-hygroscopic and may therefore be shipped long distances, and over seas, and may be kept for a long time. At the place of use it is mixed with the desired quantity of filling materials and with an amount of water sufficient to bring it to a pasty consistency. It then hardens slowly, because of the slow solubility of the magnesium sulfate in amorphous condition. As already explained, the magnesium sulfate, instead of recrystallizing rapidly, and thus weakening the stone, combines chemically with the magensia. The slow hardening results in the formation of a denser and harder mass than that obtained by the use of crystallized magnesium sulfate.

The hardened cement has a hard smooth surface and is remarkably tough and durable; it possesses great crushing and tensile strength and adheres rigidly to wood and iron. It may therefore be used to great advantage, when mixed with powdered or crushed minerals, for manufacturing artificial stone, slates and tiles. If mixed with porous materials, such as cork. wood, wood pulp, asbestos and other fibrous substances, it can be used for manufacturing isolating No. 872,376. PATENTED DEC. 3, 1907.
C. H. RUEL.
COMBINED DOOR KNOB AND KEY FASTENER.
APPLICATION FILED NOV. 14, 1906. RENEWED JULY 27, 1907.

Witnesses

Inventor
Chas. H. Ruel
By Geo. S. Vashon
Attorney